United States Patent [19]

Berry

[11] 4,195,806
[45] Apr. 1, 1980

[54] CABLE TRAY CONDUIT CLAMP
[75] Inventor: Richard C. Berry, Camillus, N.Y.
[73] Assignee: Crouse-Hinds Company, Syracuse, N.Y.
[21] Appl. No.: 840,432
[22] Filed: Oct. 7, 1977
[51] Int. Cl.² ............................................. F16L 3/24
[52] U.S. Cl. ........................................ 248/70; 248/72; 248/227; 248/228; 248/229
[58] Field of Search ............ 248/72, 70, 74 R, 74 A, 248/226.4, 227, 228, 229; 24/81 CC, 81 CR, 81 G, 81 WH, 135 L; 269/91, 97, 268; 403/188, 394, 399

[56] References Cited

U.S. PATENT DOCUMENTS

| | | | |
|---|---|---|---|
| 768,819 | 8/1904 | Palmer | 248/72 |
| 1,199,326 | 9/1916 | Weil | 248/226.1 |
| 1,737,214 | 11/1929 | Brown | 248/72 |
| 1,840,216 | 1/1932 | Tormo | 248/72 |
| 1,877,781 | 9/1932 | Akerlund | 248/72 |
| 1,888,342 | 11/1932 | Anderson | 248/72 X |
| 2,282,310 | 5/1942 | Dunn | 24/81 WH |
| 2,376,041 | 5/1945 | Ellerthorpe | 248/72 |
| 2,726,836 | 12/1955 | Dickson | 248/228 X |
| 2,875,969 | 3/1959 | Thompson | 248/72 |
| 2,901,199 | 8/1959 | Thompson | 248/72 |
| 3,228,639 | 1/1966 | Korns | 248/62 |
| 3,572,623 | 3/1971 | Lapp | 248/72 |
| 3,604,676 | 9/1971 | Weber | 248/68 R |

FOREIGN PATENT DOCUMENTS

| | | | |
|---|---|---|---|
| 988927 | 4/1965 | United Kingdom | 248/226.4 |
| 1039646 | 8/1966 | United Kingdom | 248/72 |

*Primary Examiner*—Rodney H. Bonck
*Attorney, Agent, or Firm*—Sughrue, Rothwell, Mion, Zinn and Macpeak

[57] ABSTRACT

A cable tray conduit clamp is comprised of a single one-piece body having two parallel plates extending outwardly from a common post located in one corner of the plates. A plurality of set screws are provided in one plate for securing the flange of a cable tray between plates. The post is provided with a bore in which the shank of a rod having a hooked end is freely rotatable. A locknut is threaded on a opposite end of the shank whereby a conduit may be clamped between the hooked end of the rod and the outer surface of one of the plates at any angle relative to the longitudinal direction of the cable tray to which the clamp is secured.

4 Claims, 8 Drawing Figures

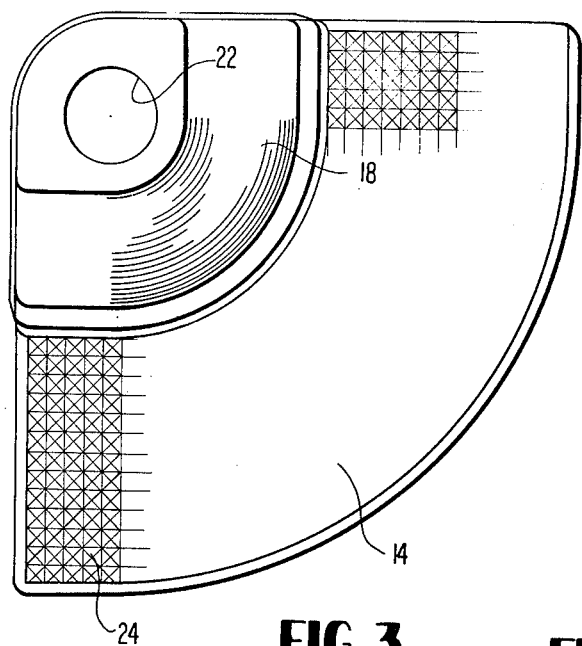
FIG 3
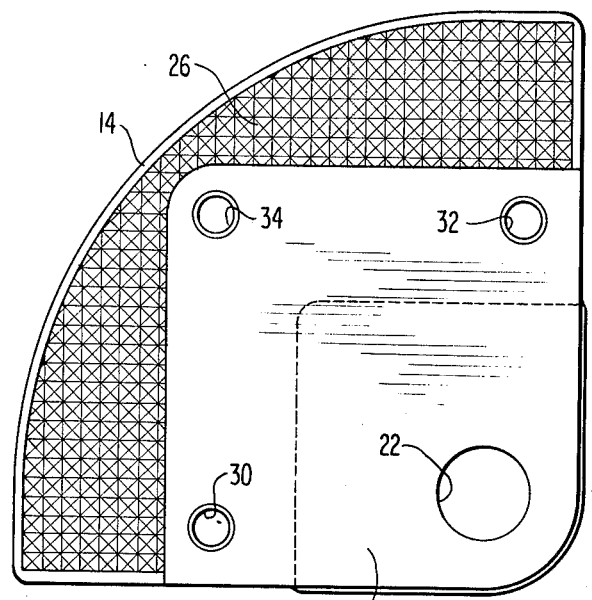
FIG 4
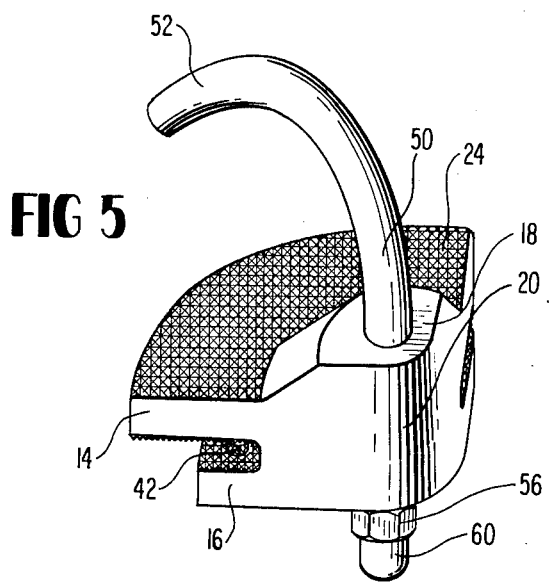
FIG 5
FIG 7
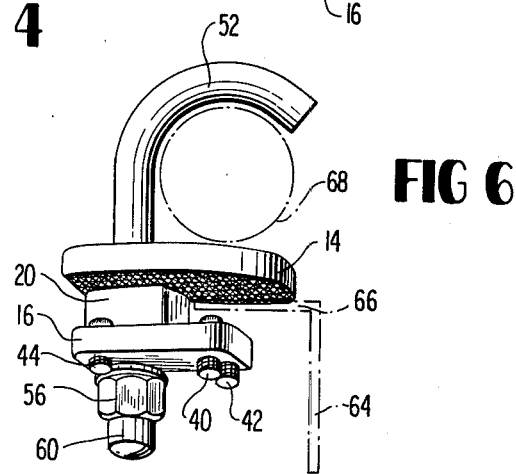
FIG 6
FIG 8

CABLE TRAY CONDUIT CLAMP

BACKGROUND OF THE INVENTION

1. Field of the Invention

The present invention is directed to a conduit clamp and more specifically to a clamp adapted to secure a conduit to the flange of a support member at any desired angle relative to the longitudinal direction of the support member.

2. Prior Art

The U.S. Pat. to Tormo, No. 1,840,216 (1932), discloses a conduit support having two parallel plates which may be secured to a beam flange which is disposed between the two plates by means of set screws extending through one of plates. A strap type conduit clamp which completely encircles the conduit is secured to the support by fastening means which extends through the ends of the strap which extend outwardly from the periphery of the conduit.

The U.S. Pat. to Akerlund, No. 1,877,781 (1932), discloses a conduit hanger which is adapted to be secured to a beam flange and is comprised of three separate clamping jaws having aligned apertures thru which a common bolt extends. The two outer most clamping jaws are freely rotatable on the bolt and the intermediate jaw is disposed in threaded engagement with the bolt. The intermediate jaw is so designed that it cooperates with both of the other jaws to produce two clamps, one of which serves to secure the hanger to the flange of an I-beam, for example, whereas the other engages and holds a conduit or the like.

The U.S. Pat. to Anderson, No. 1,888,342 (1932), is directed to a conduit hanger having a C-shaped body with a bolt threaded on an arm for clamping the body to the flange of an I-beam or the like. The other leg of the C-clamp has a post extending outwardly therefrom upon which the clamping member is freely movable whereby one or more conduits may be secured between the clamp member and the C-shaped body upon tightening a nut threaded on the end of the post.

The U.S. Pat. to Korns, No. 3,228,639 (1966), is directed to a pipe clamp having two clamping plates with aligned apertured bosses through which a bolt extends with a clamping nut threaded on the opposite end thereof. One of the plates is provided with angular notches for gripping the flange of an I-beam or the like and the other plate is provided with a V-shaped notch for holding a pipe or the like to the opposite surface of the flange when the nut and bolt draws the flanges together.

The U.S. Pat. to Weber, No. 3,604,676 (1971), is directed to a grounding and clamping device comprised of a combination conduit receiving an locking member and a flange clamp to rigidly secure and ground a metallic electrical conduit to a supporting metallic structure. A pair of adjustably coupled recessed members provide a conduit receiving cavity therebetween within which the conduit may be secured. The recessed members may be tightened about the conduit placed within the cavity by threadably engaging threaded extensions protruding from one recessed member and through registering apertures in the other. Coupled to and extending from one of the recessed members is a flange clamp adapted to rigidly secure the recessed members to a support member. At each end of the flange—adapted recessed member is a locking means threadably coupled thereto and extending into the clamp aperture to provide biting engagement between the recessed members and the support member.

SUMMARY OF THE INVENTION

The present invention provides a cable tray conduit clamp having a strong durable one-piece body having means for securing the body to the flange of a supporting member and a swivel rod having a J-shaped hook end which can swivel to accommodate any angle of the conduit so that the conduit will be securely clamped to the body at any desired angle independently of the connection of the body to the supporting flange.

The present invention provides a cable tray conduit clamp which is compact and light weight while providing a maximum degree of flexibility for securing the conduit to a cable tray.

The present invention provides a cable tray conduit clamp comprising a one-piece body having two parallel spaced apart plates interconnected by a common apertured post in one corner of said plates, screw means extending through one of said plates for securing said body to a supporting flange disposed intermediate said plates, and a clamping rod rotatably mounted in said aperture post and having a hooked portion at one end thereof for holding the conduit to one of said plates and threaded means on the opposite end for drawing said hook portion toward said body.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 3 is a top plan view of the one-piece body of the clamp of FIG. 1 without the clamping rod.

FIG. 4 is a bottom plan view of the body of the clamp of FIG. 1 without the clamping rod.

FIG. 5 is a top perspective view of the clamp of FIG. 1.

FIG. 6 is a bottom perspective view of the clamp in FIG. 1 showing its relation schematically relative to a support flange and a conduit.

FIG. 7 is a top perspective view of a modified clamp according to the present invention.

FIG. 8 is a side elevational view of the modified clamp shown in FIG. 7.

DETAILED DESCRIPTION OF THE INVENTION

Figure 1:
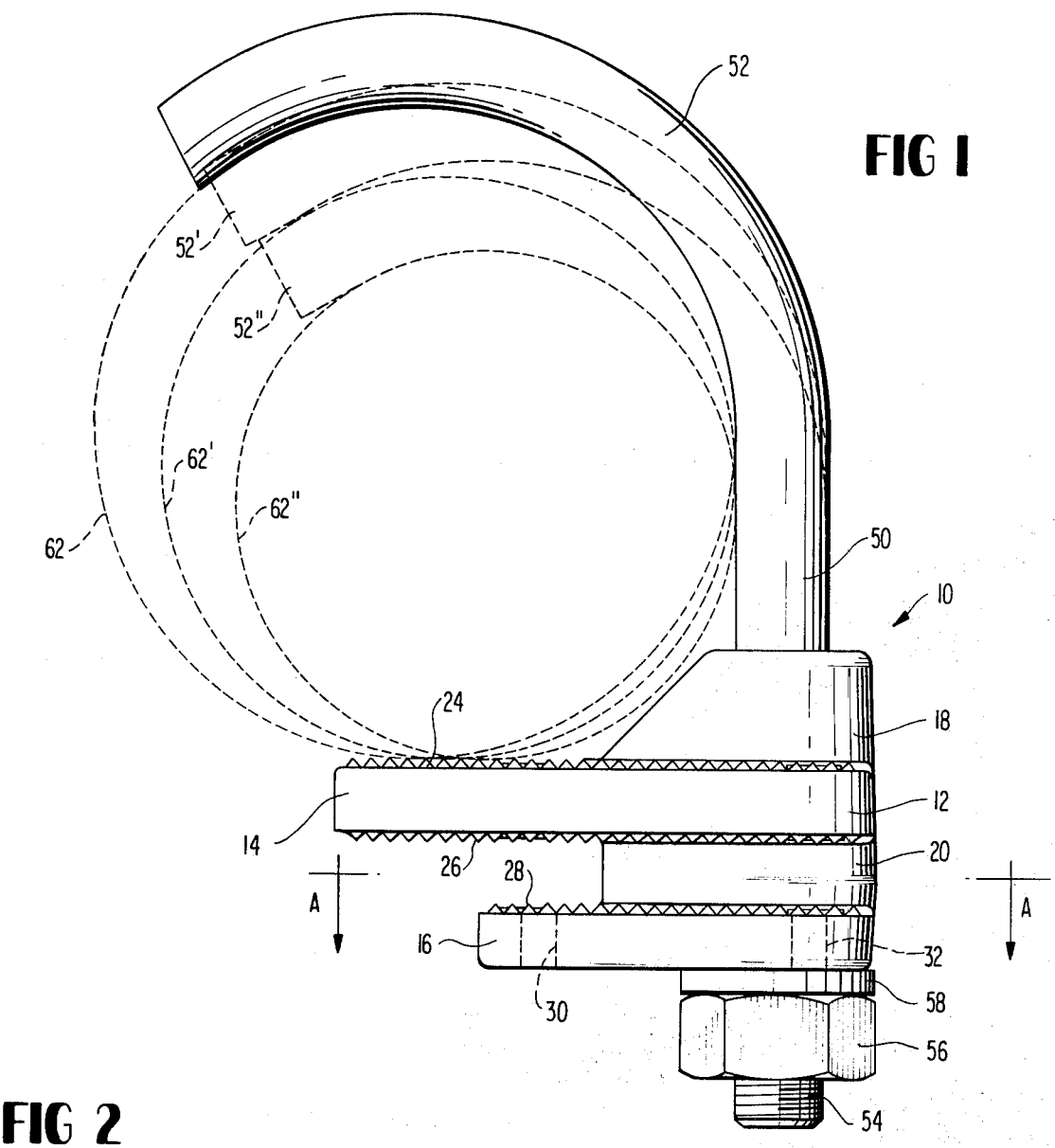
FIG. 1 is a side elevational view of a first embodiment of the cable tray conduit clamp according to the present invention.
Figure 2:
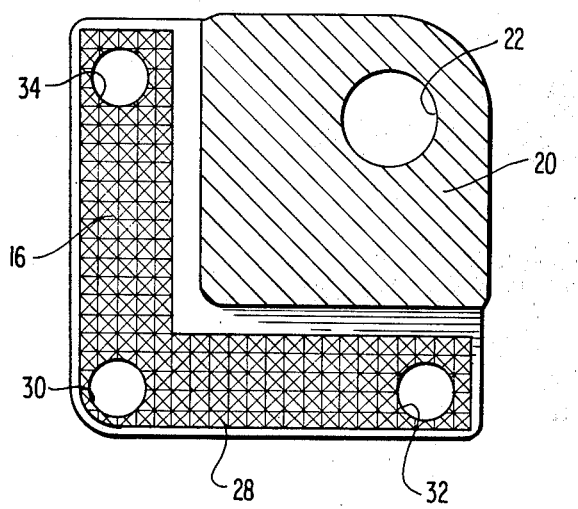
FIG. 2 is a sectional view taken along the line A—A of FIG. 1.

The cable tray conduit clamp 10 shown in FIG. 1 is comprised of a one-piece cast iron body 12. The body 12 is comprised of two parallel spaced apart plates 14 and 16 which are interconnected by a post portion 20 at one corner of the plates. A boss 18 is located on the upper surface of the plate 14 directly above the post 20 and a bore 22 extends through the boss 18, plate 12, post 20 and plate 16. The opposite surfaces 24 and 26 of the plate 14 are knurled as is the surface 28 of the plate 16 which is opposed to the surface 26 of the plate 14. The lower plate 16 is provided with three threaded bores 30, 32 and 34 for the reception of set screws 40, 42 and 44, respectively.

A rod 50 having a first end 52 formed as a J-shaped hook is rotatably mounted in the bore 22 in the body 12. The opposite end 54 of the rod has a locknut 56 threaded thereon with a washer 58 disposed between the locknut 56 and the lower plate 16. The threaded portion of the rod 54 which protrudes beyond the locknut 56 may be covered with a plastic cap 60 as shown in FIGS. 5 and 6. The J-shaped hook 52 is formed so that the internal radius which grips a conduit 62 is slightly smaller than the conduit radius. This keeps the hook at right angles to the conduit and also allows the spring characteristics of the steel rod which forms the J-shaped hook 52 to provide a uniform grip on the conduit as the locknut 56 is tightened. Additionally this smaller radius allows the J-shaped hook 52 to compensate for variations in the diameters of the conduit. It will accommodate rigid conduit, intermediate metal conduit and electrical metallic tubing of a given trade size.

Other rods having slightly differently shaped hook portions 52' and 52" may be substituted for the rod 50 to accommodate conduits 62' and 62" of different diameters as best seen in FIG. 1.

In order to install and use the conduit clamp 10 of the present invention, the plates 14 and 16 are placed on opposite sides of a flange 66 which may be a portion of an angle iron 64, a cable tray, an I-beam or the like as best seen in FIG. 6. The set screws 40 and 42 will then be tightened to clamp the flange 66 securely against the knurled surface 26 of the upper plate 14. The locknut 56 may then be losened sufficiently to allow the J-shaped hook 52 to be swiveled over a conduit 68 resting on the knurled upper surface 24 of the plate 14. Since the knurled surface 24 extends along a 90° arc about the boss 18, the conduit may be disposed at any angle relative to the longitudinal axis of the flange 66 between 0° and 90°. With the J-shaped hook 52 disposed over the conduit, the locknut 56 will then be tightened to draw the J-shaped hook into clamping engagement with the conduit 68 to securely clamp it to the plate 14.

A modified form of conduit clamp is shown in FIGS. 7 and 8 which is suitable for clamping smaller diameter conduits. The only difference between the clamp 70 of FIGS. 7 and 8 and the clamp 10 of FIG. 1-6 is the configuration of the upper plate 14'. The plate 14' will have a substantially rectangular confirguration coextensive with the configuration of the lower plate 16'. The upper plate 14' may be smaller since the conduits which are utilized with this particular clamp are of a smaller diameter than those utilized with the clamp of FIG. 1.

While the invention has been particularly shown and described with reference to a preferred embodiment thereof, it will be understood by those skilled in the art that the foregoing and other changes in form and detail as may be made therein without departing from the spirit and scope of the invention.

The body of the conduit cable tray clamp is so configured that it may be mounted in either of 2 positions, one 90° from the other. This results in the conduit entry angle being anywhere within 180°.

What is claimed is:

1. A conduit clamp for securing a conduit at any desired angle relative to a flanged support comprising a one-piece body member having a post, a pair of parallel spaced apart plates each having a pair of side edges disposed at right angles to each other, said plates being disposed on opposite ends of said post located adjacent said right angles between said side edges of said plates, flat, knurled gripping surfaces on said plates extending between said side edges around said post and a raised boss on the outer surface of one of said plates disposed in alignment with said post, said body having an aperture extending through said boss, plates and post perpendicular to said plates, a rod rotatably mounted in said aperture having a hook-shaped end portion spaced from the plate having the boss thereon, fastening means secured to the opposite end of said rod for drawing said hook portion toward said body to clamp a conduit therebetween and set screw means threaded through the other of said plates for movement into clamping engagement with a flange support disposed between said plates whereby said clamp may be secured to a flanged support with either of said pair of side edges disposed perpendicular to the flanged support.

2. A conduit clamp as set forth in claim 1, wherein the opposite surfaces of said one plate are knurled to provide a frictional grip with a conduit and a flanged support.

3. A conduit clamp as set forth in claim 1, wherein the plate adjacent the hook portion of the rod has a greater surface area than the other plate.

4. A conduit clamp as set forth in claim 1, wherein the surface area of one plate is commensurate with the surface area of the other plate.

* * * * *